(12) United States Patent
Bowie

(10) Patent No.: US 11,373,246 B2
(45) Date of Patent: Jun. 28, 2022

(54) SYSTEM FOR ANONYMOUS COMMUNICATION

(71) Applicant: Keyana Bowie, Woodbridge, VA (US)

(72) Inventor: Keyana Bowie, Woodbridge, VA (US)

( * ) Notice: Subject to any disclaimer, the term of this patent is extended or adjusted under 35 U.S.C. 154(b) by 684 days.

(21) Appl. No.: 15/599,043

(22) Filed: May 18, 2017

(65) Prior Publication Data
US 2017/0345100 A1    Nov. 30, 2017

Related U.S. Application Data

(60) Provisional application No. 62/340,617, filed on May 24, 2016.

(51) Int. Cl.
*G06Q 40/08* (2012.01)
*G06Q 10/10* (2012.01)

(52) U.S. Cl.
CPC .............. *G06Q 40/08* (2013.01); *G06Q 10/10* (2013.01)

(58) Field of Classification Search
CPC .................................................... G06Q 40/08
See application file for complete search history.

(56) References Cited

U.S. PATENT DOCUMENTS

| | | | | |
|---|---|---|---|---|
| 9,443,270 | B1* | 9/2016 | Friedman | G06Q 40/08 |
| 2003/0200171 | A1* | 10/2003 | Kochansky | G06Q 40/06 |
| | | | | 705/39 |
| 2009/0108057 | A1 | 4/2009 | Mu | |
| 2009/0122780 | A1* | 5/2009 | Valdivia | H04W 72/1263 |
| | | | | 370/349 |
| 2010/0216494 | A1* | 8/2010 | Abdel-Moiti Moik | |
| | | | | H04W 12/02 |
| | | | | 455/466 |
| 2011/0173278 | A1 | 7/2011 | Salonen | |
| 2012/0036226 | A1 | 2/2012 | Chor | |
| 2012/0109690 | A1* | 5/2012 | Weinrauch | G06Q 10/10 |
| | | | | 709/217 |
| 2012/0138671 | A1 | 6/2012 | Gaede | |
| 2012/0331405 | A1* | 12/2012 | Eidelson | H04M 1/72436 |
| | | | | 715/758 |
| 2013/0018726 | A1 | 1/2013 | Ionescu | |
| 2013/0197945 | A1* | 8/2013 | Anderson | G06Q 40/08 |
| | | | | 705/4 |
| 2013/0218983 | A1* | 8/2013 | Richard | H04M 3/42008 |
| | | | | 455/411 |
| 2013/0290326 | A1 | 10/2013 | Lebedev | |
| 2014/0051418 | A1 | 2/2014 | van Os | |
| 2015/0113012 | A1* | 4/2015 | Silver | G06F 16/245 |
| | | | | 707/758 |
| 2015/0145695 | A1* | 5/2015 | Hyde | G08G 1/166 |
| | | | | 340/905 |

(Continued)

OTHER PUBLICATIONS

Glenn, Alex. "How Police Catch Uninsured Drivers," NerdWallet, https://www.nerdwallet.com/article/insurance/how-police-catch-uninsured-drivers (Dec. 23, 2015). (Year: 2015).*

*Primary Examiner* — Elizabeth H Rosen
(74) *Attorney, Agent, or Firm* — DLA Piper LLP (US)

(57) ABSTRACT

A communication system including a server configured, in response to receiving an identification code of a first user from a second user via a mobile device of the second user, to retrieve personal identification information of the first user and to contact the first user with a message on behalf of the second user in a manner that does not identify the second user to the first user and the first user to the second user without authorization.

24 Claims, 16 Drawing Sheets

(56) References Cited

U.S. PATENT DOCUMENTS

2016/0152211 A1* 6/2016 Owens .................. B60R 25/102
348/148

* cited by examiner 111   122

SYSTEM FOR ANONYMOUS COMMUNICATION

CROSS-REFERENCE TO RELATED APPLICATIONS

This application claims the benefit of U.S. Provisional Patent Application 62/340,617, filed May 24, 2016, the contents of which are hereby incorporated by reference.

BRIEF DESCRIPTION OF THE DRAWINGS

The aspects of the present disclosure will be better understood by reading the following detailed description of the illustrative embodiments of the disclosure, when considered in connection with the accompanying drawings.

DETAILED DESCRIPTION

Hereinafter, illustrative embodiments will be described in detail with reference to the accompanying drawings.

The matters defined in the description, such as detailed construction and elements, are provided to assist in a comprehensive understanding of illustrative embodiments. Thus, it is apparent that illustrative embodiments can be carried out without those specifically defined matters. Also, functions or elements known in the related art may not be described in detail since they would obscure the illustrative embodiments with unnecessary detail. Furthermore, it should be understood that the term "or" is inclusive.

The term "message" generally refers to a signal representing a digital message. The servers described herein can be implemented on standard, general-purpose computers or they can be implemented as specialized devices. The servers may operate electronically, optically or in any other fashion.

An overview of a communication system 100, according to an embodiment in which a user may contact a vehicle owner without identifying the user to the vehicle owner or the vehicle owner to the user without authorization, is described with reference to FIGS. 1-4.

Figure 3:
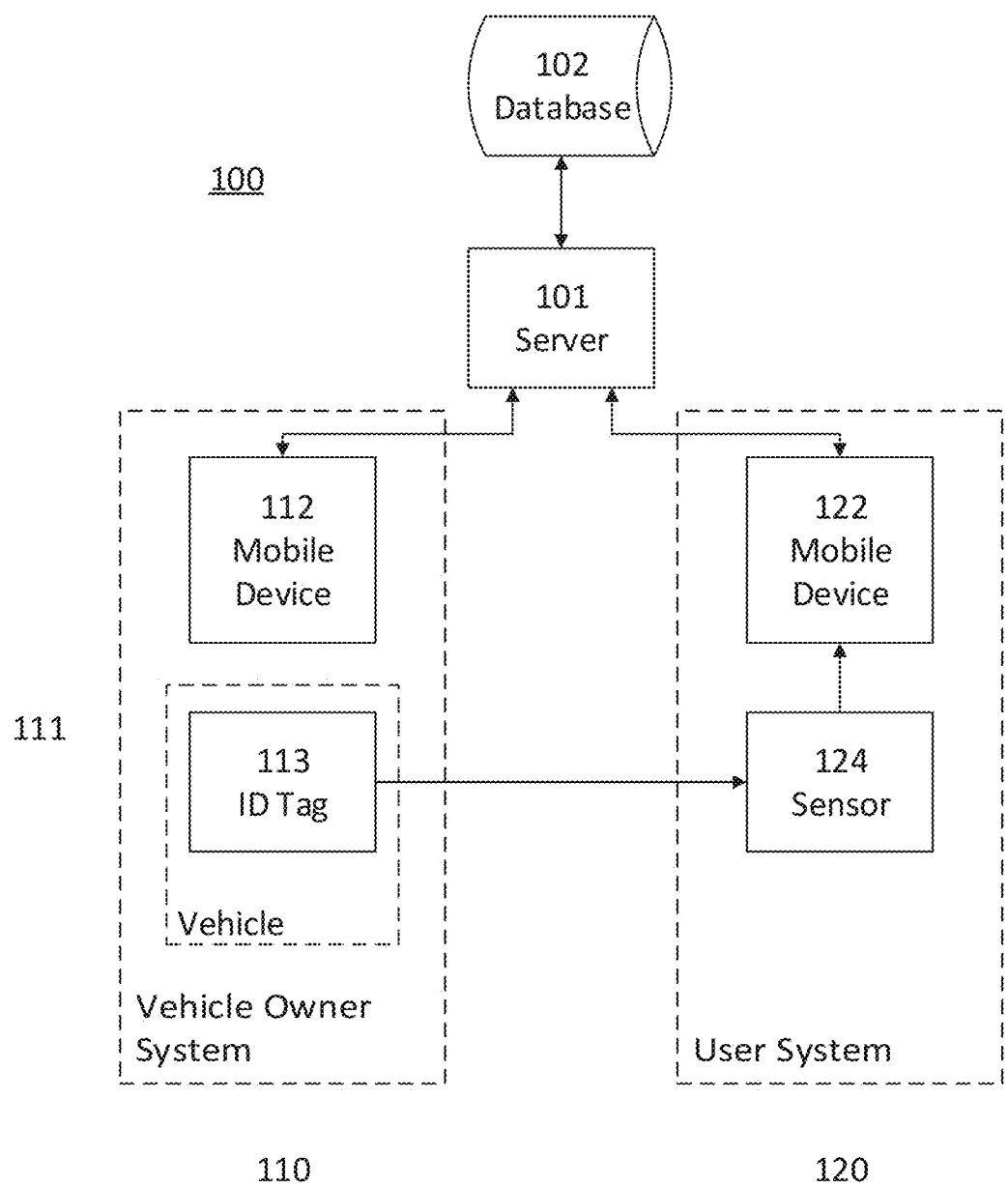
FIG. 3 is a diagram illustrating a communication system according to an illustrative embodiment.

Referring to FIG. 3, the communication system 100 is described. The communication system 100 may include a server 101 connected to a database 102. The communication system 100 may further include vehicle owner systems and user systems, for example, a vehicle owner system 110 of a vehicle owner and a user system 120 of a user.

The vehicle owner system 110 may include an identification tag 113 associated with a vehicle 111 and having an identification code of the vehicle owner, and a mobile device 112 configured to be communicatively connected to the server 101.

The user system 120 may include a mobile device 122 configured to be communicatively connected to the server 101, and a sensor 124 connected to or a part of the mobile device 122 and configured to detect the identification code from the identification tag 113. The user system 120 may also include elements of a vehicle owner system.

The server 101 may include at least one computer. The database may be a part of the server 101 or externally connected to the server 101. The database 102 may also include at least one database. The database 102 may include registered vehicle owner information and identification codes respectively associated with the information of each registered vehicle owner, including the vehicle owner of the vehicle owner system 110. However, the database may also include, for example, multiple identification codes associated with the information for each registered vehicle owner.

Referring to the vehicle owner system 110, the vehicle 111 may be, for example, a car, truck, boat, or motorcycle. The identification tag 113 may include any machine-readable medium, including a two-dimensional bar code or a radio frequency identification tag. The identification tag 113 may further include an identification code of the vehicle owner. The identification tag 113 may be attached to the vehicle 111 in any location in which the sensor 124 may detect the identification code from the identification tag 113.

Figure 1:
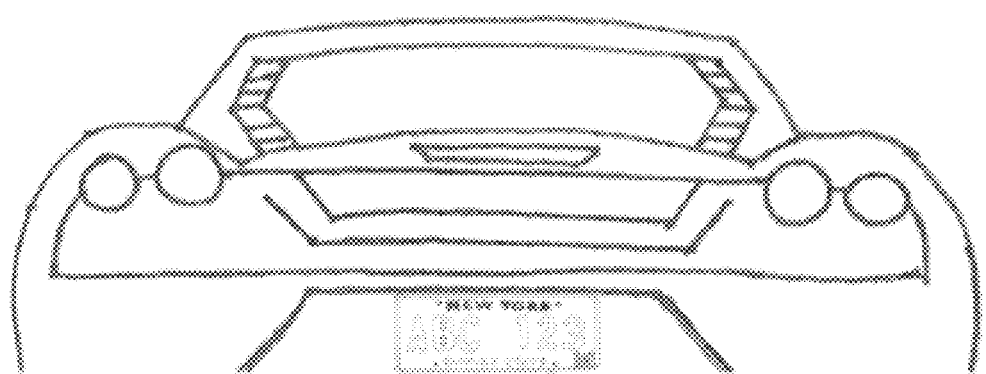
FIG. 1 is a view illustrating an identification tag placement according to an illustrative embodiment.

For example, as illustrated in FIG. 1, the identification tag 113 may be a two-dimensional barcode attached to a license plate 115 of the vehicle 111. The identification tag 113 may be attached to a window or any other surface of the vehicle 111 viewable from an exterior of the vehicle 111. Alternatively, the identification tag may be, for example, a radio frequency identification tag and attached to an interior of the vehicle 111.

Alternatively or additionally, the identification code may be associated with the vehicle 111, separate from the identification tag 113, when the identification code includes vehicle information such as, for example, license plate information of the license plate 115 or a vehicle identification number of the vehicle 111. Accordingly, the vehicle owner system 110 may not include the identification tag 113.

The mobile device 112 may be any type of electronic device configured for communication including, for example, a mobile phone. Referring to the user system 120, the mobile device 122 may be any type of electronic device configured for communication including, for example, a mobile phone. The sensor 124 may be any type of sensor that is configured to detect an identification code from the identification tag 113 or from an aspect of the vehicle 111 having vehicle information such as, for example, a license plate 115 of the vehicle 111. For example, the sensor 124 may be a camera, a microphone, radio frequency identification sensor, or a radio receiver. The sensor 124 may also be configured for active or passive sensing. The mobile device 122 may also be configured for manual inputting of the identification code by the user.

Figure 4:
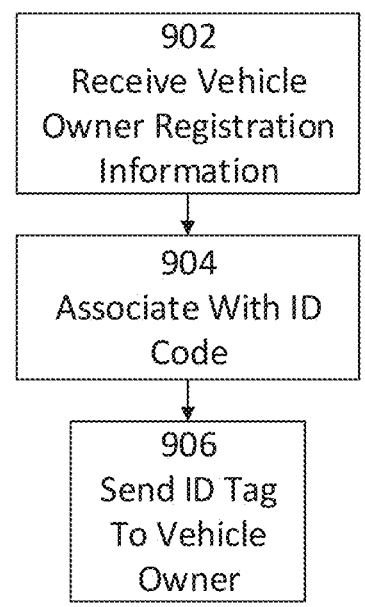
FIG. 4 is a flowchart illustrating an operation for registering a vehicle owner for a communication system according to an illustrative embodiment.

Referring to FIG. 4, a registration operation 900 by the server 101 is described in which the vehicle owner may register to use a communication system, such as, for example, the communication system 100, by providing registration information to a server 101. First, the server 101 receives 902 the registration information of the vehicle owner. Second, the server 101 associates 904 the registration information with an identification code. The registration information may include personal information, vehicle(s) information, and insurance information. Third, the identification tag 113 with the identification code is sent 906 to the vehicle owner. Alternatively, the vehicle owner may not be sent the identification tag 113 when, for example, the identification code includes vehicle information such as license plate information or a vehicle identification number of the vehicle owner.

Referring to FIG. 1, the identification tag 113 may be associated with the vehicle 111 of the vehicle owner. As illustrated in FIG. 1, the identification tag 113 may be a two-dimensional barcode attached to the license plate 115 of the vehicle 111. Alternatively, the identification tag 113 may be attached to a window or any other aspect of the vehicle, and the identification tag 113 may be any other machine-readable medium, including a radio frequency identification tag.

Alternatively or additionally, the identification code may be associated with the vehicle 111, separate from the identification tag 113, when the identification code comprises vehicle information such as, for example, license plate information of the license plate 115 or a vehicle identification number of the vehicle 111. Accordingly, the identification code may be, for example, associated with the license plate 115.

Figure 2:
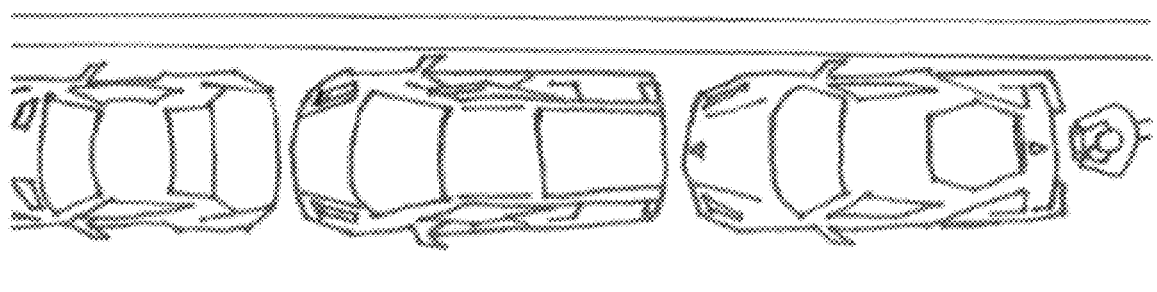
FIG. 2 is a view illustrating an aspect of a user operation for contacting a vehicle owner according to an illustrative embodiment.

Referring to FIG. 2, a user of the communication system 100 may initiate anonymous messaging with a vehicle owner by using a mobile device 122 to detect the identification code from the identification tag 113 associated with the vehicle 111 or from an aspect of the vehicle 111 having vehicle information such as, for example, the license plate 115 of the vehicle 111.

Figure 5:
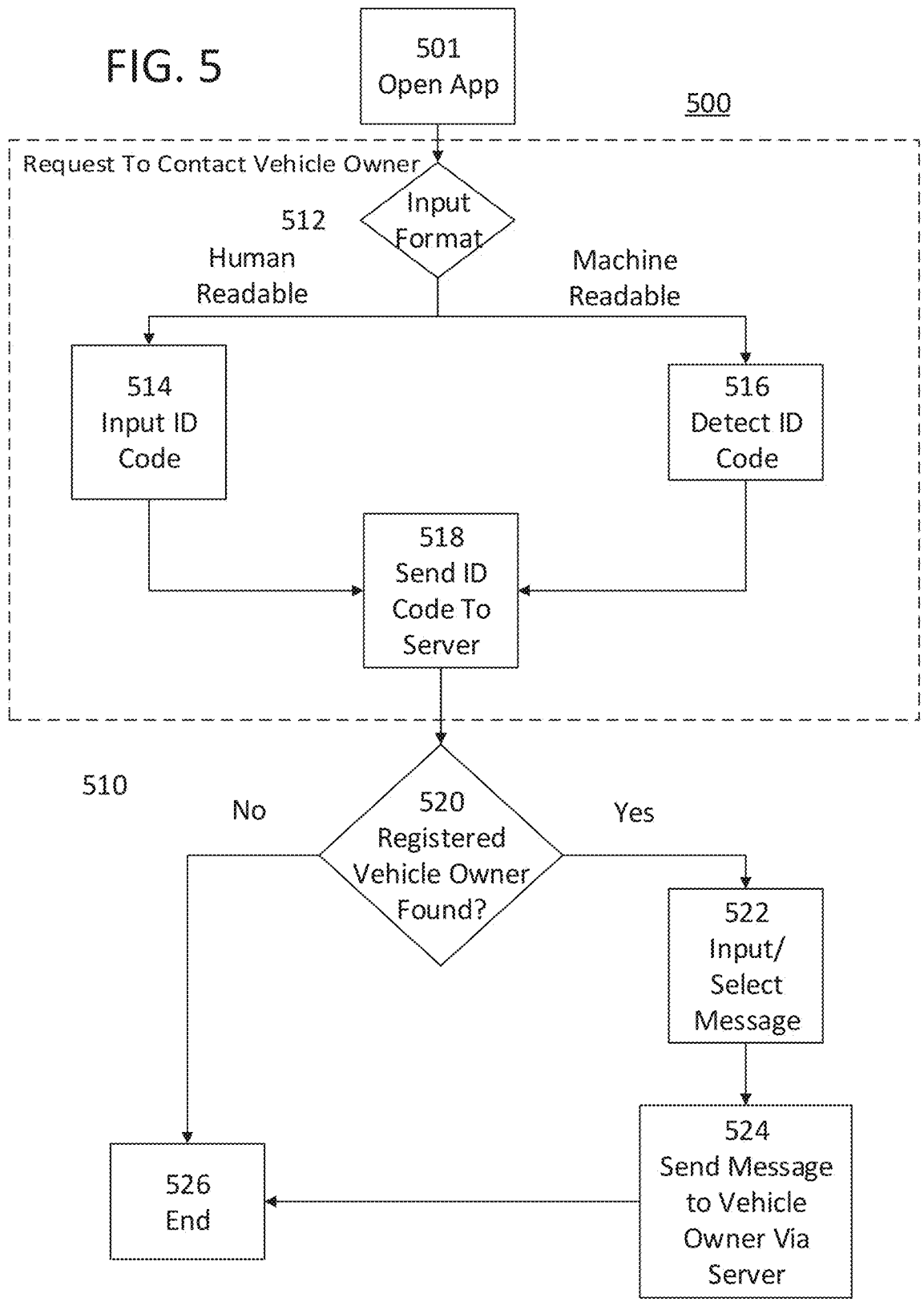
FIG. 5 is a flow chart illustrating a user operation for contacting a vehicle owner according to an illustrative embodiment.
Figure 6:
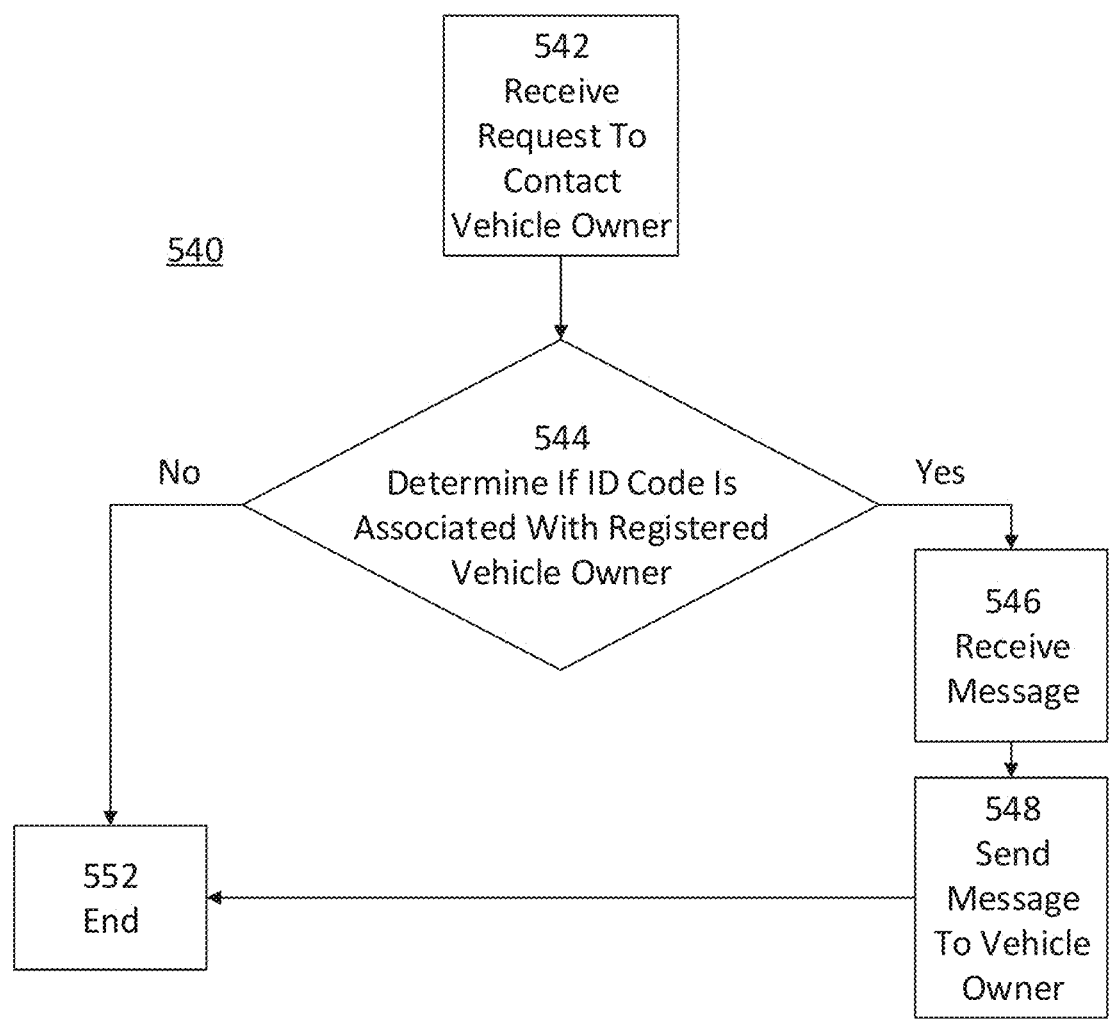
FIG. 6 is a flow chart illustrating a server operation of a communication system according to an illustrative embodiment.

Referring to FIGS. 5 and 6, a user operation 500 and a server operation 540 of the communication system 100 for contacting a vehicle owner are described.

After opening an application 501, the user may provide a request 510 to contact a vehicle owner to the server 101. The request 510 to contact a vehicle owner may first include inputting 514 an identification code of the vehicle owner into the mobile device 122 or detecting 516 an identification code of the vehicle owner with the mobile device 122, based on whether the identification code is in a human-readable format or a machine-readable format 512. For example, the identification code may be inputted 514 in a human-readable format when the identification code includes vehicle identification information of the vehicle of the vehicle owner, such as license plate information or a vehicle identification number. The identification code may alternatively be detected 516 by the mobile device 122 when in a machine-readable format, for example when the sensor 124 can detect the identification code from the identification tag 113 or can optically read vehicle identification information of the vehicle 111.

Referring to the human-readable format, the user may manually input 514 the identification code into the mobile device 122. The user may then send 518 the identification code to the server 101 from the mobile device 122. Accordingly, the request 510 to contact a vehicle owner may be complete.

Referring to the machine-readable format, the user may use the sensor 124 to detect the identification code from the identification tag 113 or from vehicle identification information available on the vehicle 111. The user may then send 518 the identification code from the mobile device 122 to the server 101. Accordingly, the request to contact a vehicle owner 510 may be complete.

After the server 101 receives 542 the request 510 to contact the registered vehicle owner from the user, the server 101 determines 544 whether the identification code received is associated with a registered vehicle owner. The server 101 may determine 544 whether the identification code received from the user is associated with registered vehicle owner information within the database 102.

If the server 101 determines no registered vehicle owner is associated with the identification code received from the user, the server operation 540 may end 552. Accordingly, the mobile device 122, in determining 520 whether a registered vehicle owner is found, may determine no registered vehicle owner is found and may end 526 the user operation 500.

If the server 101 determines a registered vehicle owner is associated with the identification code received from the mobile device 122, the user may input in or select on 522 the mobile device 122 a message to send to the mobile device 112 of the registered vehicle owner.

The message may be of any format or combination of formats including text, audio, image, or video. However, the mobile device 112 or the server 101 may predetermine the formats send-able by the mobile device 122 or receivable by the mobile device 112. The mobile device 112 or the server 101 may also predetermine the message send-able by the mobile device 122 or receivable by the mobile device 112. For example, the user may be limited to selecting a message on the mobile device 122 from a list of pre-determined messages, as determined by the mobile device 112 or the server 101, for sending to the mobile device 112.

After inputting in or selecting on 522 the mobile device 122 a message, the user may send 524 the message from the mobile device 122 to the mobile device 112 of the registered vehicle owner via the server 101. For example, the server 101 receives 546 the message from the mobile device 122 and then sends 548 the message to the mobile device 112 of the registered vehicle owner. Alternatively, instead of the server 101 receiving 546 the message from the mobile device 122 of the user, the server 101 may receive an indication of the message from the mobile device 122 of the user. The server 101 may then send the message or an indication of the message to the mobile device 112 of the registered vehicle owner. Following, the user operation may end 526 and the server operation may end 552.

Figure 7:
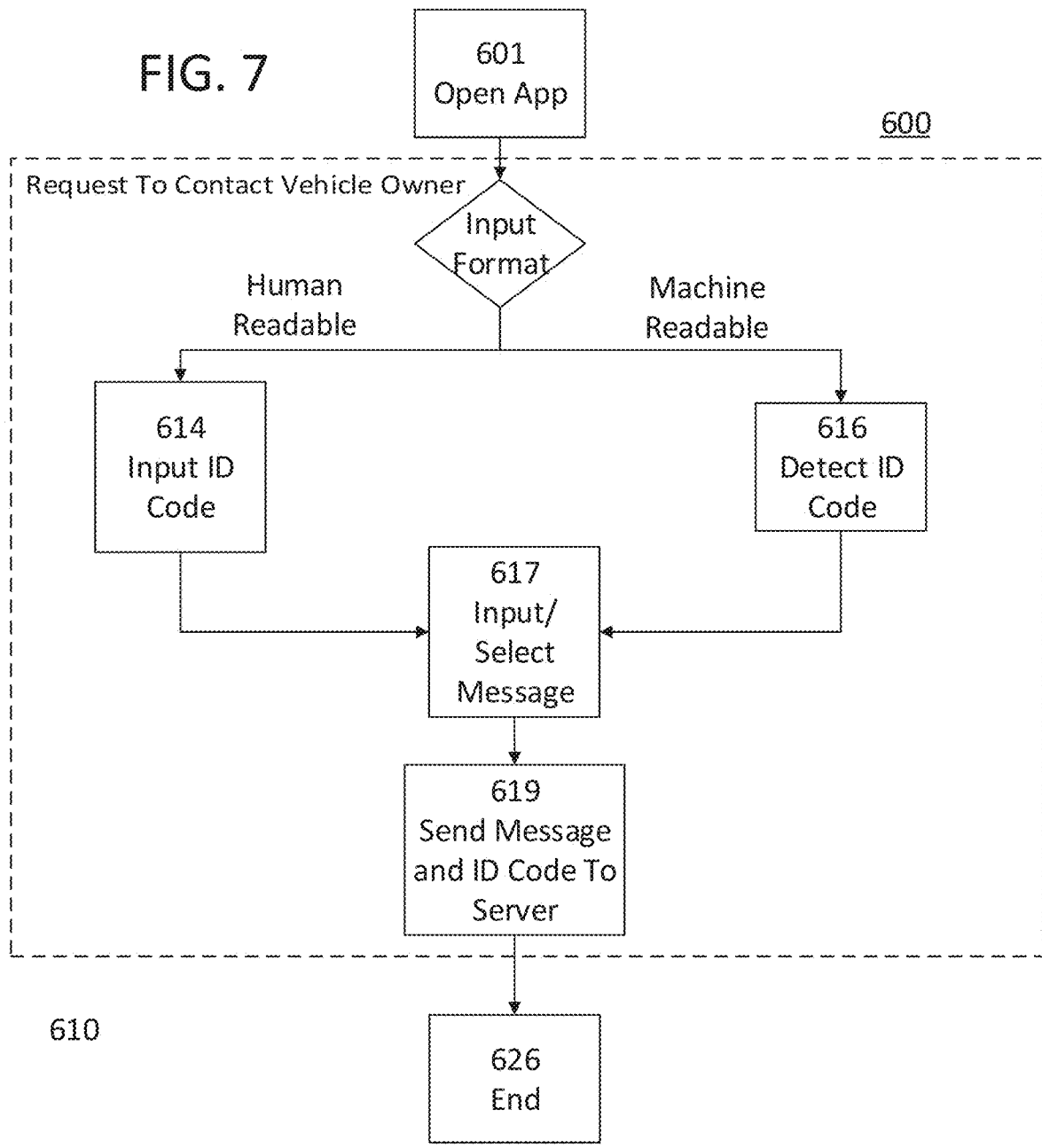
FIG. 7 is a flow chart illustrating a user operation for contacting a vehicle owner according to an illustrative embodiment.
Figure 8:
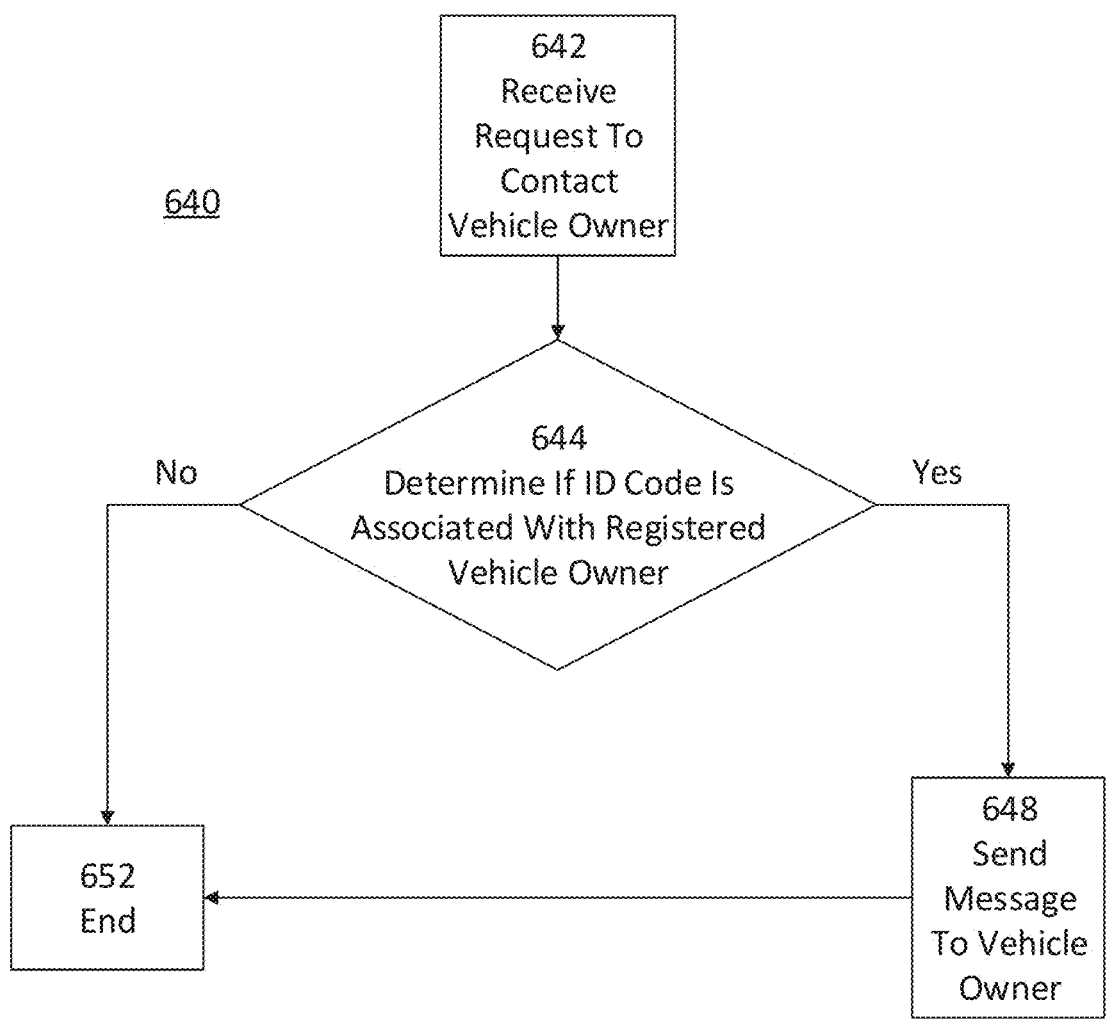
FIG. 8 is a flow chart illustrating a server operation of a communication system according to an illustrative embodiment.

Referring to FIGS. 7 and 8, an alternative user operation 600 and server operation 640 of the communication system 100 for contacting a vehicle owner are described.

After opening an application 601, the user may provide a request 610 to contact a vehicle owner to the server 101. The request 610 to contact a vehicle owner may first include inputting 614 an identification code of the vehicle owner into the mobile device 122 of the user or detecting 616 an identification code of the vehicle owner with the mobile device 122 in a human-readable format or a machine-readable format, based on whether the identification code is in a human-readable format or a machine-readable format 612, similar to as described with the request 510 to contact vehicle owner described in reference to FIG. 5. The user may then input in or select on 617 a message on the mobile device to send to the mobile device of the registered vehicle owner.

The message may be of any format or combination of formats including text, audio, image, or video. However, the registered vehicle owner or the server may predetermine the formats send-able by the user or receivable by the registered vehicle owner. The registered vehicle owner or the server may also predetermine the message send-able by the user or receivable by the registered vehicle owner. For example, the user may be limited to selecting a message from a list of pre-determined messages, as determined by a registered vehicle owner or the server, for sending to the registered vehicle owner.

After inputting in or selecting on 617 the mobile device 122 a message, the user may send 619 the message and the identification code from the mobile device 122 to the server 101. Accordingly, the request 610 to contact the registered vehicle owner may be complete and the user operation 600 may end 626.

Alternatively, instead of the mobile device 122 of the user sending 619 the message and the identification code from the mobile device 122 to the server 101, the mobile device 122 may send an indication of the message to the server 101. Following, the request 610 to contact the registered vehicle owner may be complete and the user operation 600 may end 626.

After the server receives the request 642 to contact the registered vehicle owner from the user, the server 101 may determine 644 whether the identification code received is associated with a registered vehicle owner. The server 101 may determine 644 whether the identification code received from the user is associated with registered vehicle owner information within the database 102.

If the server 101 determines no registered vehicle owner is associated with the identification code received from the user, the server operation 640 may end 652.

If the server 101 determines a registered vehicle owner is associated with the identification code received from the mobile device 122, the server 101 may send 648 the message to the mobile device 112 of the registered vehicle owner. Alternatively, the server 112 may send an indication of the message to the mobile device 112 of the registered vehicle owner. Following, the server operation 640 may end 652.

Figure 14:
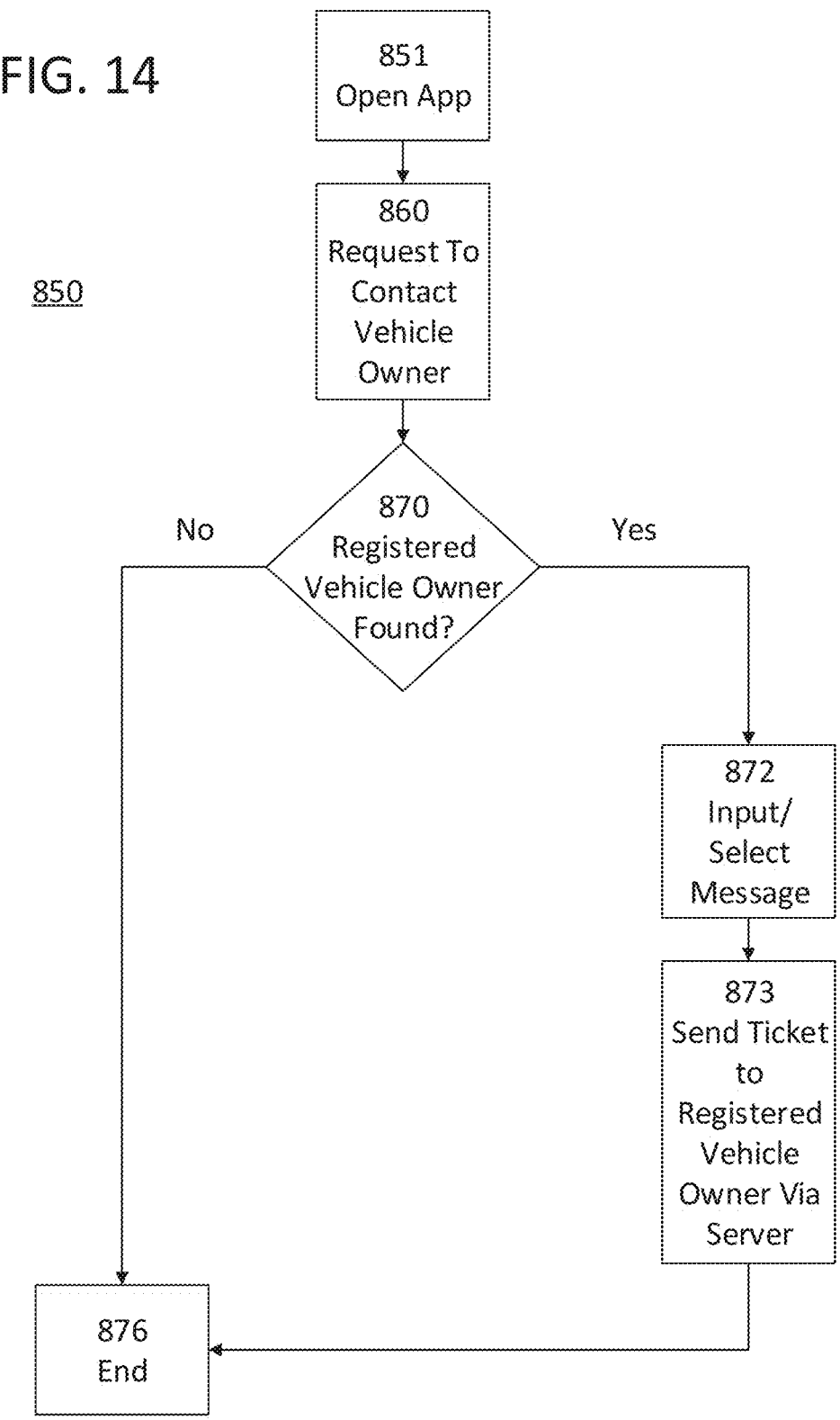
FIG. 14 is a flow chart illustrating a law enforcement method for contacting a vehicle owner according to an illustrative embodiment.

Referring to FIG. 14, an alternative user operation 850 of the communication system 100 is described wherein the user is a law enforcement user.

After opening an application 851, the user may send a request 860 to contact a vehicle owner from the mobile device 122 to the server 101. The request 860 to contact a vehicle owner may be similar to the request 510 described with reference to FIG. 5. The server 101 may then determine whether the request 860 corresponds with a registered vehicle owner.

If the server 101 determines no registered vehicle owner corresponds with the request 860, then the mobile device 122, in determining 870 whether a registered vehicle owner is found, may determine no registered vehicle owner is found and may end 876 the user operation 850.

If the server 101 determines a registered vehicle owner corresponds with the request 860, then the mobile device 122, in determining 870 whether a registered vehicle owner is found, may determine a registered vehicle owner is found. The user may then input in or select on 872 the mobile device 122 ticket information to send to the mobile device 112 of the registered vehicle owner.

After inputting in or selecting on 872 the mobile device 122 the ticket information, the user may send 873 the ticket information from the mobile device 122 to the mobile device 112 of the registered vehicle owner via the server 101. For example, the server 101 receives the ticket information from the mobile device 122 and then sends the ticket information to the mobile device 112 of the registered vehicle owner. Alternatively, instead of the server 101 receiving the ticket information from the mobile device 122 of the user, the server 101 may receive an indication of the ticket information from the mobile device 122 of the user. The server 101 may then send the ticket information or an indication of the ticket information to the mobile device 112 of the registered vehicle owner. Following, the user operation 850 may end 876.

Alternatively or additionally, the mobile device 122 may send the ticket information from the mobile device 122 to any device of the vehicle owner other than the mobile device 112 or from the mobile device 122 directly to any device of the vehicle owner, including the mobile device 112. The mobile device 122 may also receive vehicle owner information from the server 101 in response to sending a request 860 to contact a vehicle owner in which the server 101 determines the request 860 corresponds with a registered vehicle owner.

Figure 9:
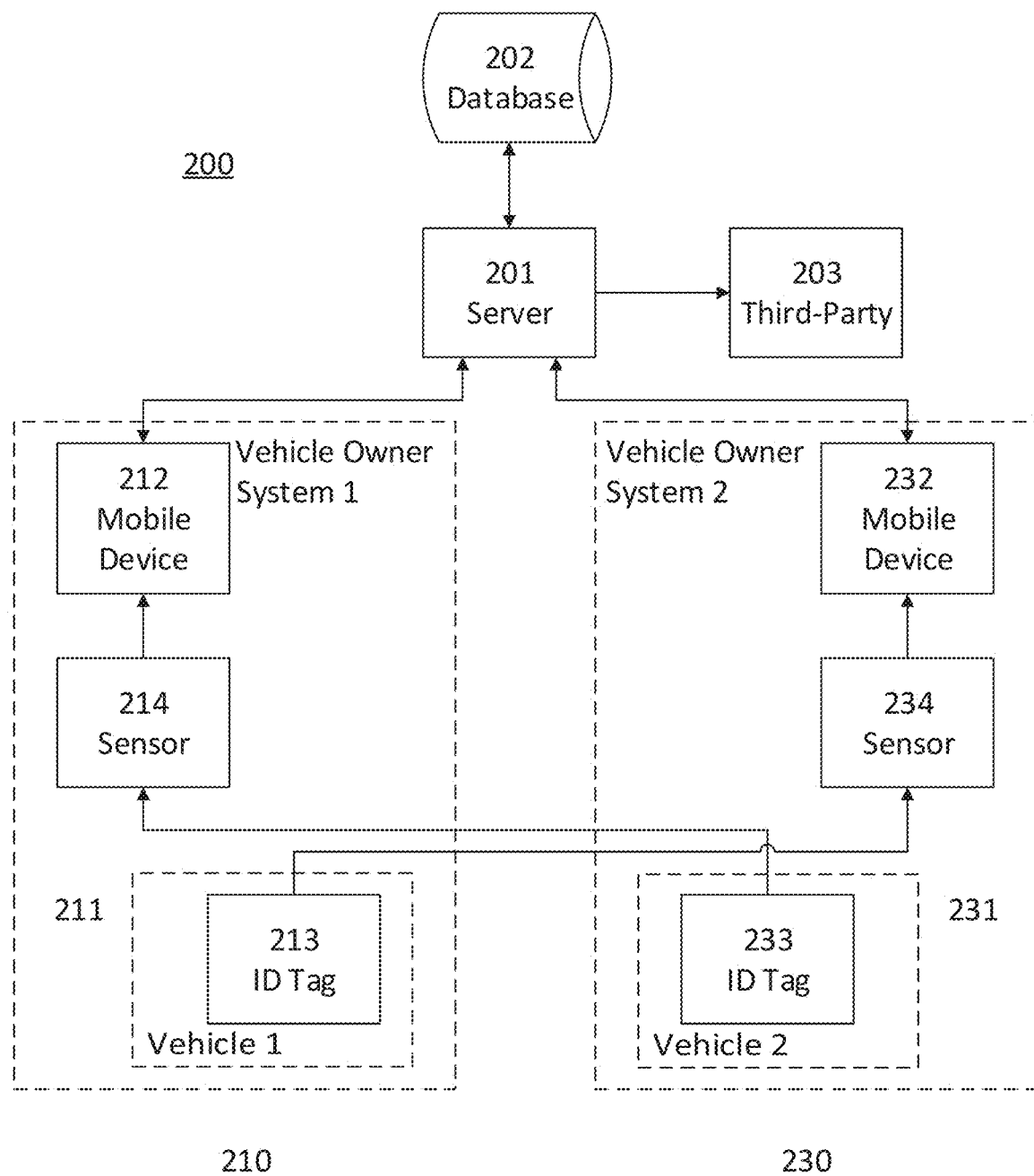
FIG. 9 is a diagram illustrating a communication system for communication between vehicle owners according to an illustrative embodiment.

Referring to FIG. 9, a communication system 200 is described. The communication system 200 may include a server 201 connected to a database 202. The communication system 200 may further include vehicle owner systems, for example, a first vehicle owner system 210 of a first vehicle owner and a second vehicle owner system 220 of a second vehicle owner. The server 201 may also be configured to be communicatively connected to a third-party 203.

The first vehicle owner system 210 may include an identification tag 213 of the first vehicle owner associated with a vehicle 211 of the first vehicle owner and having an identification code of the first vehicle owner, a mobile device 212 of the first vehicle owner configured to be communicatively connected to the server 201, and a sensor 214 of the first vehicle owner connected to or a part of the mobile device 212 of the first vehicle owner and configured to detect an identification code of the second vehicle owner from an identification tag 233 of the second vehicle owner or from, for example, a license plate of a vehicle 231 of the second vehicle owner.

The second vehicle owner system 230 may include the identification tag 233 of the second vehicle owner associated with the vehicle 231 of the second vehicle owner and having the identification code of the second vehicle owner, a mobile device 232 of the second vehicle owner configured to be communicatively connected to the server 201, and a sensor 234 of the second vehicle owner connected to or a part of the mobile device 232 of the second vehicle owner and configured to sense the identification code of the first vehicle owner from the identification tag 213 of the first vehicle owner or from, for example, a license plate of the vehicle 211 of the first vehicle owner.

The server 201 may include at least one computer. The database 202 may be a part of the server 201 or externally connected to the server 201. The database 202 may also include at least one database. The database 202 may include registered vehicle owner information and identification codes respectively associated with the information of each registered vehicle owner, including the first and second vehicle owners. However, the database 202 may also include, for example, multiple identification codes associated with the information of at least one of the registered vehicle owners. The registered vehicle owner information may include personal identification information, vehicle(s) information, and insurance information of the respective registered vehicle owner.

Referring to the first vehicle owner system 210 and the second vehicle owner system 230, the vehicle 211 of the first vehicle owner and the vehicle 231 of the second vehicle owner may each be, for example, a car, truck, boat, or motorcycle. The identification tag 213 of the first vehicle owner and the identification tag 213 of the second vehicle owner may each include any machine-readable medium, including a two-dimensional bar code or a radio frequency identification tag. The identification tag 213 of the first vehicle owner may include the identification code of the first vehicle owner and the identification tag 233 of the second vehicle system may include the identification code of the second vehicle owner. The identification tag 213 of the first vehicle owner may be attached to the vehicle 211 of the first vehicle owner in any location in which the sensor 234 of the second vehicle owner may sense the identification code of the first vehicle owner from the identification tag 213 of the first vehicle owner. The identification tag 233 of the second vehicle owner may be attached to the vehicle 231 of the second vehicle owner in any location in which the sensor 214 of the first vehicle system may sense the identification code of the second vehicle owner from the identification tag 233 of the second vehicle owner.

Alternatively or additionally, the identification code of the first vehicle owner may be associated with the vehicle 211, separate from the identification tag 213, when the identification code of the first vehicle owner includes vehicle information of the first vehicle owner such as, for example, license plate information of a license plate of the first vehicle owner or a vehicle identification number of the vehicle 211. Accordingly, the vehicle owner system 210 may not include the identification tag 213.

Alternatively or additionally, the identification code of the second vehicle owner may be associated with the vehicle 231, separate from the identification tag 233, when the identification code of the second vehicle owner includes vehicle information of the first vehicle owner such as, for example, license plate information of a license plate of the second vehicle owner or a vehicle identification number of the vehicle 231. Accordingly, the vehicle owner system 230 may not include the identification tag 233.

The mobile device 212 of the first vehicle owner and the mobile device 232 of the second vehicle owner may each be of any type of electronic device configured for communication including, for example, a mobile phone.

The sensor 214 of the first vehicle owner may be of any type of sensor that is configured to sense the identification code of the second vehicle owner from the identification tag 233 of the second vehicle owner or from an aspect of the vehicle 231 having vehicle information such as, for example, a license plate of the vehicle 231. The sensor 234 of the second vehicle owner may be of any type of sensor that is configured to sense the identification code of the first vehicle owner from the identification tag 213 of the first vehicle owner or from an aspect of the vehicle 211 having vehicle information such as, for example, a license plate of the vehicle 211. For example, the sensor 214 and the sensor 234 may be a camera, a microphone, radio frequency identification sensor, or a radio transmitter. The sensor 214 of the first vehicle owner and the sensor 234 of the second vehicle owner may also be configured for active or passive sensing. Any of the mobile device 212 of the first vehicle owner and the mobile device 232 of the second vehicle owner may also be configured for manual inputting of an identification code.

Figure 10:
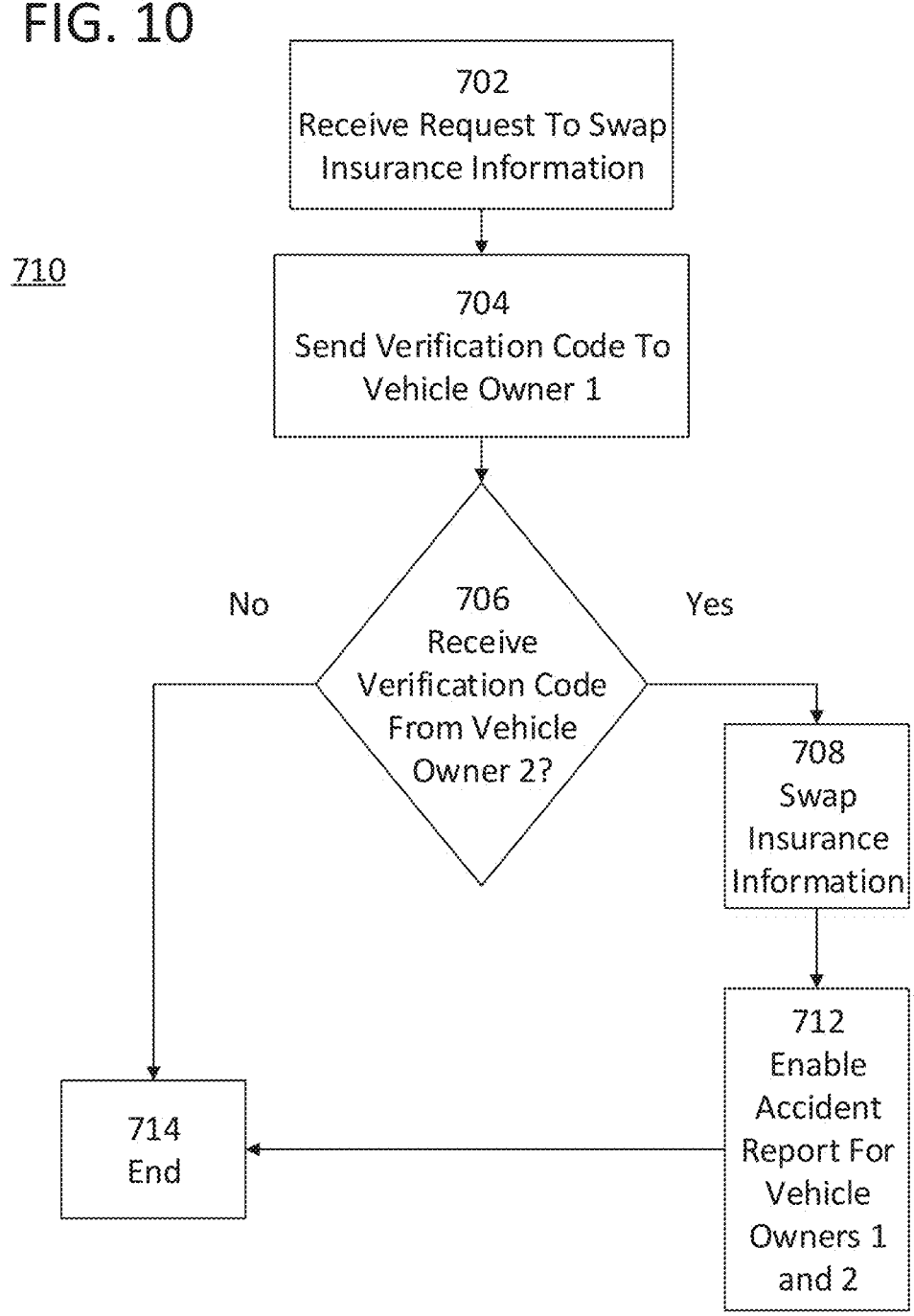
FIG. 10 is a flow chart illustrating a server operation for swapping insurance information according to an illustrative embodiment.

Referring to FIG. 10, a server operation 710 of the communication system 200 for swapping insurance information is described.

The server 201 may receive a request 702 to swap insurance information. The request 702 may be sent from a mobile device of a registered vehicle owner, such as, for example, one of the mobile device 212 of the first vehicle owner and the mobile device 232 of the second vehicle owner. The request 702 may include an identification number of another of the registered vehicle owners, for example, the other of the first vehicle owner and the second vehicle owner, for swapping insurance information.

If the request 702 includes the identification number of a registered vehicle owner, the server 201 may then send a verification code to either the vehicle owner whom sent the request 702 or the vehicle owner associated with the identification number sent in the request 702. For example, the server may then send 704 a verification code to the mobile device 212 of the first vehicle owner. Following, the first vehicle owner may provide the verification code to the second vehicle owner to demonstrate consent to an insurance swapping operation. Accordingly, the server 201 may receive 706 the verification code from the second vehicle owner via the mobile device 232.

If the server 201 does not receive 706 the verification code from the second vehicle owner via the mobile device 232, the server operation 600 may end 714.

If the server 201 receives 706 the verification code from the second vehicle owner via the mobile device 232, the server may perform an operation 708 to swap insurance information. The operation 708 may include sending personal identification information or insurance information of the first vehicle owner from the server 201 to the mobile device 232 of the second vehicle owner or to the third-party 203, for example, an insurance company of the second vehicle owner. The operation 708 may alternatively or additionally include sending personal identification or insurance information of the second vehicle owner from the server 201 to the mobile device 212 of the first vehicle owner or to the third-party 203, for example, an insurance company of the first vehicle owner.

The server 201 may also enable 712 an accident report for the first and second vehicle owners to send a message via the server 201 to the third-party 203, such as, for example, an insurance company, to provide information concerning an accident between the first and second vehicle owners.

Following, the server operation 710 may end 714.

Figure 11:
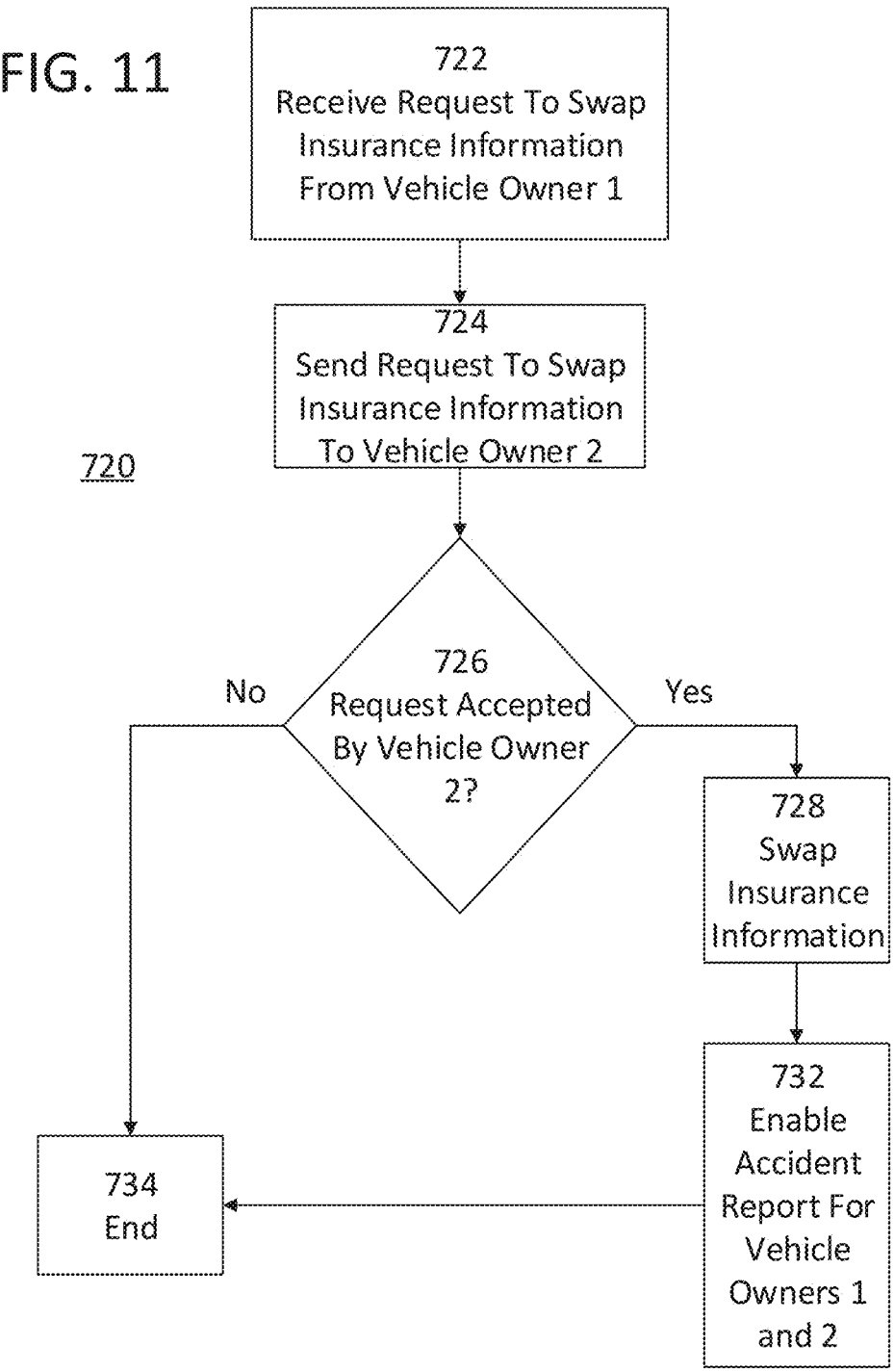
FIG. 11 is a flow chart illustrating a server operation for swapping insurance information according to an illustrative embodiment.

Referring to FIG. 11, an alternative server operation 720 of the communication system 200 for swapping insurance information is described.

The server 201 may receive a request 722 to swap insurance information. The request 702 may be sent from a mobile device of a registered vehicle owner, such as, for example, the mobile device 212 of the first vehicle owner. The request 722 may include an identification number of another of the registered vehicle owners, for example, the second vehicle owner, for swapping insurance information.

If the request 722 includes the identification number of the second vehicle owner, the server 201 may then send a request 724 to swap insurance information to the mobile device 232 of the second vehicle owner.

The server 201 may then receive 726 an indication from the mobile device 232 as to whether the second vehicle owner accepts the request to swap insurance information.

If the server 201 does not receive an indication from the second vehicle owner via the mobile device 232 or receives an indication that the second vehicle owner does not accept the request to swap insurance information, the server operation 720 may end 734.

If the server 201 receives 726 an indication that the second vehicle owner accepts the request to swap insurance information, the server may perform an operation 728 to swap insurance information. The operation 728 may include sending personal identification or insurance information of the first vehicle owner from the server 201 to the mobile device 232 of the second vehicle owner or to the third-party 203, for example, an insurance company of the second vehicle owner. The operation 728 may alternatively or additionally include sending personal identification or insurance information of the second vehicle owner from the server 201 to the mobile device 212 of the first vehicle owner or to the third-party 203, for example, an insurance company of the first vehicle owner.

The server 201 may also enable 732 an accident report for the first and second vehicle owners to send a message via the server 201 to the third-party 203, such as, for example, an insurance company, to provide information concerning an accident between the first and second vehicle owners.

Following, the server operation 720 may end 734.

Figure 12:
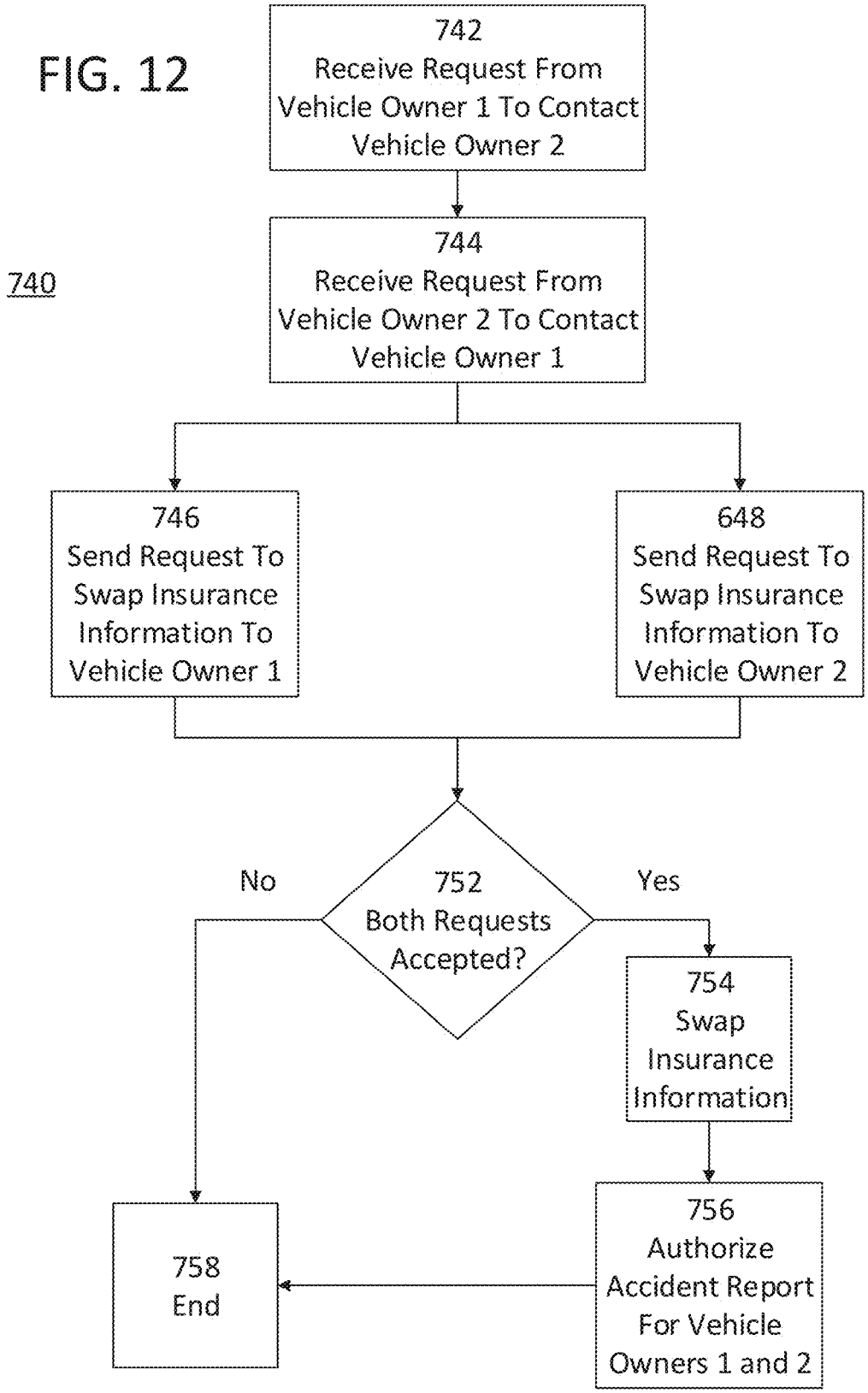
FIG. 12 is a flow chart illustrating a server operation for swapping insurance information according to an illustrative embodiment.

Referring to FIG. 12, an alternative server operation 740 of the communication system 200 for swapping insurance information is described.

The server 201 may receive a request 742 from the mobile device 212 of the first vehicle owner to contact the second vehicle owner. The server 201 may also receive a request 744 from the mobile device 232 of the second vehicle owner to contact the first vehicle owner. If the server 201 receives requests 742 and 744, the server may then send a request 746 to swap insurance information to the mobile device 212 of the first vehicle owner and a request 748 to swap insurance information to the mobile device 232 of the second vehicle owner.

The server 201 may then receive 752 an indication from the mobile device 212 as to whether the first vehicle owner accepts the request 746 to swap insurance information and an indication from the mobile device 232 as to whether the second vehicle owner accepts the request 748 to swap insurance information.

If the server 201 does not receive 752 an indication from both the first vehicle owner via the mobile device 212 and the second vehicle owner via the mobile device 232 that the requests 746 and 746 are respectively accepted, the server operation 740 may end 758.

If the server 201 receives 752 an indication from both the first vehicle owner via the mobile device 212 and the second vehicle owner via the mobile device 232 that the requests 746 and 746 are respectively accepted, the server may perform an operation 754 to swap insurance information. The operation 754 may include sending personal identification or insurance information of the first vehicle owner from the server 201 to the mobile device 232 of the second vehicle owner or to the third party 203, for example, an insurance company of the second vehicle owner. The operation 728 may alternatively or additionally include sending personal identification or insurance information of the second vehicle owner from the server 201 to the mobile device 212 of the first vehicle owner or to the third-party 203, for example, an insurance company of the first vehicle owner.

The server 201 may also enable 756 an accident report for the first and second vehicle owners to send a message via the server 201 to the third-party 203, such as, for example, an insurance company, to provide information concerning an accident between the first and second vehicle owners.

Following, the server operation 740 may end 758.

Figure 13:
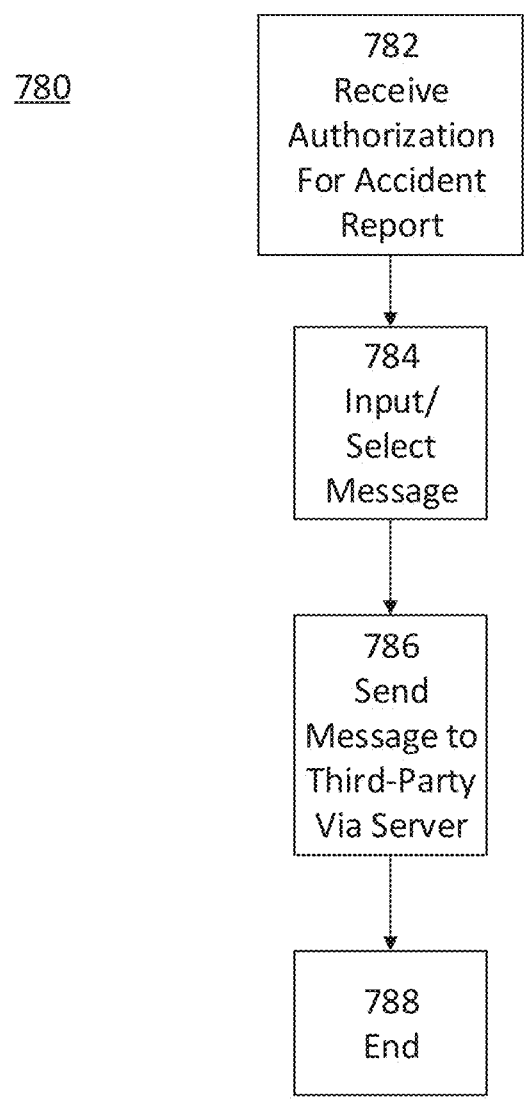
FIG. 13 is a flow chart illustrating a user operation for reporting a vehicle accident according to an illustrative embodiment.

Referring to FIG. 13, a vehicle owner operation 780 of the communication system 200 for an accident report. The vehicle owner operation 780 is described with reference to the first vehicle owner. However, the operation 780 may be performed by any vehicle owner, including any other registered vehicle owner.

The mobile device 212 may receive 782 authorization from the server 201 for an accident report. The first vehicle owner may then input in or select on 784 on the mobile device 212 a message. The first vehicle owner may then send 786 the message from the mobile device 212 to the third party 203 via the server 201. Alternatively or additionally, the first vehicle owner may send 786 the message from the mobile device 212 to the mobile device 232 of the second vehicle owner. The message may also be accompanied with personal identification or insurance information of the first vehicle owner when sent from the server 201 to the mobile device 232 or the third-party 203.

The vehicle owner operation 780 may then end 788.

Figure 15:
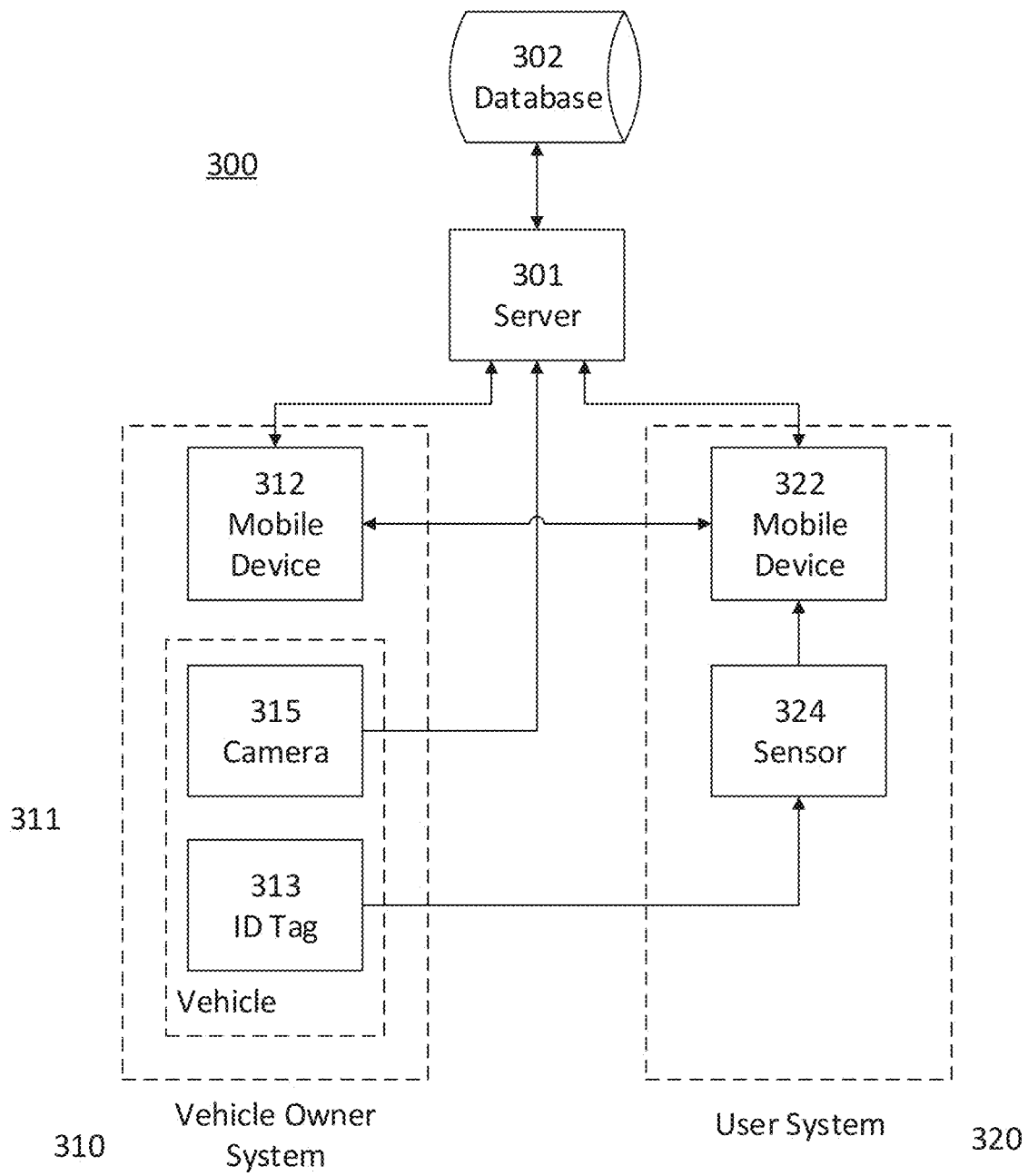
FIG. 15 is a diagram illustrating a communication system according to an illustrative embodiment.

Referring to FIG. 15, a communication system 300 is described. The communication system 300 may include a server 301 connected to a database 302. The communication system 100 may further include vehicle owner systems and user systems, for example, a vehicle owner system 310 of a vehicle owner and a user system 320 of a user.

The vehicle owner system 310 may include a vehicle 311 with a camera 315 configured to be communicatively connected to the server 101, an identification tag 313 associated with the vehicle 311 and having an identification code of the vehicle owner, and a mobile device 312 configured to be communicatively connected to the server 101.

The user system 320 may include a mobile device 322 configured to be communicatively connected to the server 301, and a sensor 324 connected to or a part of the mobile device 322 and configured to sense the identification code from the identification tag 313 or from, for example, a license plate of a vehicle 311 of the vehicle owner.

The server 301 may include at least one computer. The database 302 may be a part of the server 301 or externally connected to the server 301. The database 302 may also include at least one database. The database 302 may include registered vehicle owner information and identification codes respectively associated with the information of each registered vehicle owner, including the vehicle owner of the vehicle owner system 310. However, the database may also include, for example, multiple identification codes associated with the information for each registered vehicle owner. The vehicle owner information may include, for example, personal identification or insurance information.

Referring to the vehicle owner system 310, the vehicle 311 may be, for example, a car, truck, boat, or motorcycle. The identification tag 313 may include any machine-readable medium, including a two-dimensional bar code or a radio frequency identification tag. The identification tag 313 may further include an identification code of the vehicle owner. The identification tag 313 may be attached to the vehicle 311 in any location in which the sensor 324 may sense the identification code from the identification tag 313.

Alternatively or additionally, the identification code of the vehicle owner may be associated with the vehicle 311, separate from the identification tag 313, when the identification code of the vehicle owner includes vehicle information of the vehicle owner such as, for example, license plate information of a license plate of the vehicle owner or a vehicle identification number of the vehicle 311. Accordingly, the vehicle owner system 310 may not include the identification tag 313.

The mobile device 312 may be any type of electronic device configured for communication including, for example, a mobile phone. The camera 315 may be configured to take still or video images and may be associated with the vehicle 311 in any location that enables the camera 315 to take images of the interior or exterior of the vehicle 311.

Referring to the user system 320, the mobile device 322 may be any type of electronic device configured for communication including, for example, a mobile phone. The sensor 324 may be any type of sensor that is configured to sense an identification code from the identification tag 313 or from an aspect of the vehicle 311 having vehicle information such as, for example, a license plate of the vehicle 311. For example, the sensor 324 may be a camera, a microphone, radio frequency identification sensor, or a radio receiver. The sensor 324 may also be configured for active or passive sensing. The mobile device 322 may also be configured for manual inputting of the identification code by the user.

Figure 16:
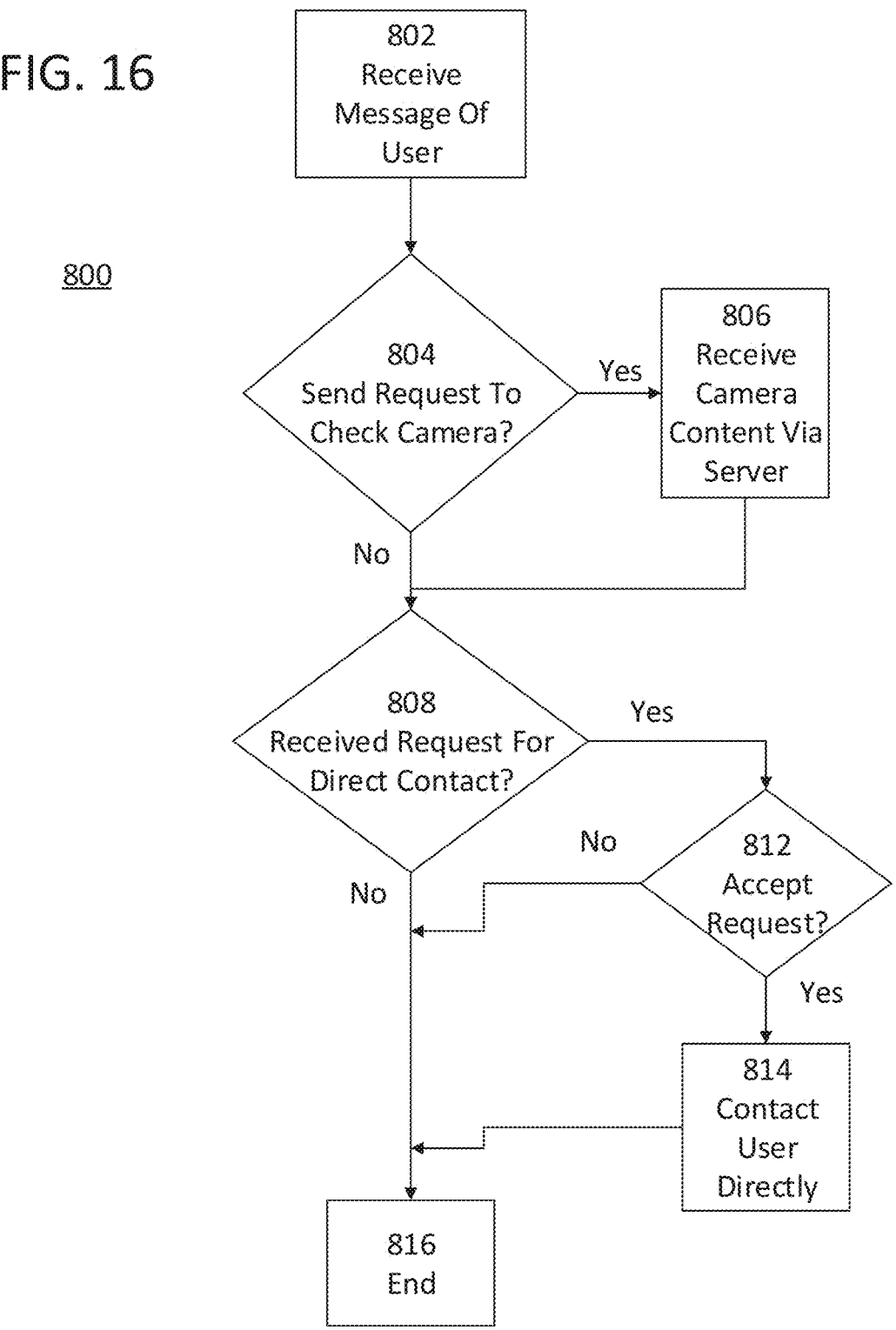
FIG. 16 is a flow chart illustrating vehicle owner operations of a communication system according to an illustrative embodiment.

Referring to FIG. 16, a vehicle owner operation 800 of the communication system 300 is described.

Following receiving 802 a message of the user from the server 301, the vehicle owner may send a request 804 to check the camera 315. The vehicle owner may send the request 804 from the mobile device 312 to the camera 315 via the server 301. The mobile device 312 may then receive 806 an image or images from the camera 315 via server 301 that may provide the vehicle owner information about the vehicle 311 or any individuals nearby the vehicle 311.

Alternatively or additionally, the mobile device 312 may receive a request 808 for direct contact from the mobile device 322 of the user via the server 301. If the mobile device 312 receives the request, the vehicle owner may send an indication from the mobile device 312 to the server 301 as to whether the request 812 is accepted by the vehicle owner. If the request 812 is not accepted by the vehicle owner, the vehicle owner operation 800 may end 816. If the request 812 is accepted by the vehicle owner, the server 301 may enable the vehicle owner and the user to contact each other directly. For example, the server 301 may provide personal contact information of the user to the mobile device 312 of the vehicle owner or personal contact information of the vehicle owner to the mobile device 322 of the user. Alternatively, the server 301 may enable voice or video communication between the mobile device 312 of the vehicle owner and the mobile device 322 of the user via the server 301.

The foregoing embodiments are merely examples and are not to be construed as limiting the disclosure. The embodiments can be readily applied to other types of systems and made or operated by other methods. Also, the description of the embodiments is intended to be illustrative, and not to limit the scope of the claims, and many alternatives, modifications, and variations will be apparent to those skilled in the art.

What is claimed is:

1. A communication system, comprising:
an identification tag configured to be associated with a vehicle, the identification tag including a machine-readable medium and an identification code in the machine-readable medium;
a non-transitory computer readable medium storing instructions that, when executed by a mobile device of a second user, cause the mobile device of the second user to perform processing comprising:
reading, by a sensor of the mobile device of the second user, the identification tag;
formulating or selecting a message having a message format; and
transmitting the identification code and at least one of content of the message or a selection of the message to a server; and
a general purpose computer or specialized device configured to implement the server, the server configured to:
determine a first user that is identified by the identification code in response to receiving the identification code from the second user via the mobile device of the second user;
in response to determining the first user, retrieve personal identification information of the first user;
determine a message format receivable by a mobile device of the first user;
determine that the message has the message format that is the same as the determined message format;
in response to determining that the message has the message format that is the same as the determined message format, contact the first user with the message on behalf of the second user in a manner that does not identify the second user to the first user and the first user to the second user without authorization;
determine a third user that is identified by a second identification code;
in response to determining the third user, retrieve personal identification information of the third user;
determine a second message format receivable by a mobile device of the third user;
determine that a second message has a different message format from the determined second message format; and
in response to determining that the second message has the different message format, end the processing without sending the second message.

2. The communication system of claim 1, wherein the first-user identification tag is a radio-frequency identification tag.

3. The communication system of claim 1, wherein the first-user identification tag is a two-dimensional barcode.

4. The communication system of claim 1, further comprising
a database including the identification code and personal identification information of the first user associated with the identification code, wherein the server is configured to retrieve the personal identification information of the first user from the database.

5. The communication system of claim 1, wherein the identification code includes a vehicle identification number.

6. The communication system of claim 1, wherein the identification code includes license plate information.

7. The communication system of claim 1, wherein the determined message format is a text message format, an audio message format, an image message format, a video message format, or a combination thereof.

8. The communication system of claim 1, wherein the server is further configured to send the message from the server to a third-party after receiving the identification code from the mobile device of the second user and retrieving the personal identification information of the first user.

9. The communication system of claim 1, wherein the server is further configured to send insurance information of the first user to an insurance company after receiving the identification code from the second user, retrieving the personal identification information of the first user, and receiving authorization.

10. The communication system of claim 1, wherein the server is further configured to send insurance information of the first user to the mobile device of the second user after receiving the identification code from the second user, retrieving the personal identification information of the first user, and receiving authorization.

11. The communication system of claim 1, wherein the server is further configured to receive an image from a camera associated with the vehicle and to send the image to a mobile device of the first user in response to receiving a request from the mobile device of the first user.

12. The communication system of claim 1, wherein the server is further configured to enable oral communication between a mobile device of the first user and the mobile device of the second user in response to receiving authorization from the mobile device of the first user and the mobile device of the second user.

13. A method of operating a communication system, comprising:
reading, by a sensor of a mobile device of a second user, an identification tag configured to be associated with a vehicle, the identification tag including a machine-readable medium and an identification code in the machine-readable medium;
formulating or selecting a message having a message format by the mobile device of the second user;
transmitting, by the mobile device of the second user, the identification code and at least one of content of the message or a selection of the message to a server;
determining, by a server implemented by a general purpose computer or specialized device, a first user that is identified by the identification code in response to receiving the identification code from the second user via the mobile device of the second user;
in response to determining the first user, retrieving, by the server, personal identification information of the first user;
determining, by the server, a message format receivable by a mobile device of the first user;
determining, by the server, that the message has the message format that is the same as the determined message format;
in response to determining that the message has the message format that is the same as the determined message format, contacting, by the server, the first user with the message on behalf of the second user in a manner that does not identify the second user to the first user and the first user to the second user without authorization;
determining, by the server, a third user that is identified by a second identification code;
in response to determining the third user, retrieving, by the server, personal identification information of the third user;
determining, by the server, a second message format receivable by a mobile device of the third user;
determining, by the server, that a second message has a different message format from the determined second message format; and
in response to determining that the second message has the different message format, ending, by the server, a process without sending the second message.

14. The method of claim 13, wherein the first-user identification tag is a radio-frequency identification tag.

15. The method of claim 13, wherein the first-user identification tag is a two-dimensional barcode.

16. The method of claim 13, further comprising
retrieving, by the server from a database including the identification code and personal identification information of the first user associated with the identification code, the personal identification information of the first user.

17. The method of claim 13, wherein the identification code includes a vehicle identification number.

18. The method of claim 13, wherein the identification code includes license plate information.

19. The method of claim 13, wherein the determined message format is a text message format, an audio message format, an image message format, a video message format, or a combination thereof.

20. The method of claim 13, further comprising sending, by the server, the message from the server to a third-party after receiving the identification code from the mobile device of the second user and retrieving the personal identification information of the first user.

21. The method of claim 13, further comprising sending, by the server, insurance information of the first user to an insurance company after receiving the identification code from the second user, retrieving the personal identification information of the first user, and receiving authorization.

22. The method of claim 13, further comprising sending, by the server, insurance information of the first user to the mobile device of the second user after receiving the identification code from the second user, retrieving the personal identification information of the first user, and receiving authorization.

23. The method of claim 13, further comprising:
receiving, by the server, an image from a camera associated with the vehicle; and
sending, by the server, the image to mobile device of the first user in response to receiving a request from the mobile device of the first user.

24. The method of claim 13, further comprising enabling, by the server, oral communication between a mobile device of the first user and the mobile device of the second user in response to receiving authorization from the mobile device of the first user and the mobile device of the second user.

* * * * *